(12) United States Patent
Ouren et al.

(10) Patent No.: US 6,976,137 B2
(45) Date of Patent: Dec. 13, 2005

(54) PRESERVATION OF MEMORY ASSOCIATED WITH A HYPERVISOR PARTITION

(75) Inventors: Wade B. Ouren, Rochester, MN (US); Kenneth C. Vossen, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 10/422,428

(22) Filed: Apr. 24, 2003

(65) Prior Publication Data

US 2004/0215911 A1    Oct. 28, 2004

(51) Int. Cl.$^7$ .............. G06F 12/00; G06F 12/14; G06F 12/16; G06F 13/00; G06F 13/28
(52) U.S. Cl. .............. 711/156; 711/170; 711/173; 713/2
(58) Field of Search .............. 713/1, 2, 100; 711/170, 173

(56) References Cited

U.S. PATENT DOCUMENTS

| | | | |
|---|---|---|---|
| 5,559,957 A * | 9/1996 | Balk .............. | 714/23 |
| 6,493,730 B1 * | 12/2002 | Lewis et al. .............. | 707/206 |
| 6,675,275 B2 * | 1/2004 | Nimura et al. .............. | 711/170 |
| 2003/0191745 A1 * | 10/2003 | Jiang et al. .............. | 707/2 |

* cited by examiner

*Primary Examiner*—Donald Sparks
*Assistant Examiner*—Jesse Diller
(74) *Attorney, Agent, or Firm*—Owen J. Gamon (57) ABSTRACT

A method, apparatus, system, and signal-bearing medium that in an embodiment associate a persistent indicator with allocated memory and determine whether to preserve the contents of the allocated memory during an IPL (Initial Program Load) based on the persistent indicator. If the persistent indicator associated with the memory is on, the contents of that memory are preserved, and if the persistent indicator is off, the contents of that memory are discarded.

15 Claims, 7 Drawing Sheets

PRESERVATION OF MEMORY ASSOCIATED WITH A HYPERVISOR PARTITION

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

An embodiment of the invention generally relates to computers. In particular, an embodiment of the invention generally relates to the preservation of memory in a computer.

BACKGROUND

Computer technology continues to advance at a rapid pace, with significant developments being made in both software and in the underlying hardware upon which the software executes. One significant advance in computer technology is the development of multi-processor computers, where multiple computer processors are interfaced with one another to permit multiple operations to be performed concurrently, thus improving the overall performance of such computers. Also, a number of multi-processor computer designs rely on logical partitioning to allocate computer resources to further enhance the performance of multiple concurrent tasks.

With logical partitioning, a single physical computer is permitted to operate essentially like multiple and independent virtual computers (referred to as logical partitions), with the various resources in the physical computer (e.g., processors, memory, and input/output devices) allocated among the various logical partitions. Each logical partition may execute a separate operating system, and from the perspective of users and of the software applications executing on the logical partition, each separate operating system appears as a fully independent computer.

A hypervisor or partition manager, shared among the logical partitions, manages the logical partitions and allocates resources to the different logical partitions. If the partition manager encounters an error that prevents the partition manager from continuing to operate, the partition manager may need to be restarted via a technique known as a re-IPL (re-Initial Program Load). But, an ordinary IPL destroys the contents of volatile memory, which could contain information regarding the configuration of the partitions, which would be helpful on the re-IPL. The partition manager typically does not have an associated disk drive or other non-volatile memory in which to store its configuration information following an error because the partition manager typically allocates all disk drives on a per-disk drive basis to the logical partitions, which greatly simplifies the management of the logical partitions. Adding an additional disk drive solely for use by the partition manager would increase the cost of the system and decrease its competitiveness in the marketplace.

Thus, without a cost-effective way to preserve memory contents, the acceptance of computers with multiple partitions is hampered. Although the aforementioned problems of memory preservation have been described in the context of a logically-partitioned computer, they may also apply to other electronic devices.

SUMMARY

A method, apparatus, system, and signal-bearing medium are provided that in an embodiment associate a persistent indicator with allocated memory and determine whether to preserve the contents of the allocated memory during an IPL (Initial Program Load) based on the persistent indicator. If the persistent indicator associated with the memory is on, the contents of that memory are preserved, and if the persistent indicator is off, the contents of that memory are discarded.

DETAILED DESCRIPTION

Figure 1:
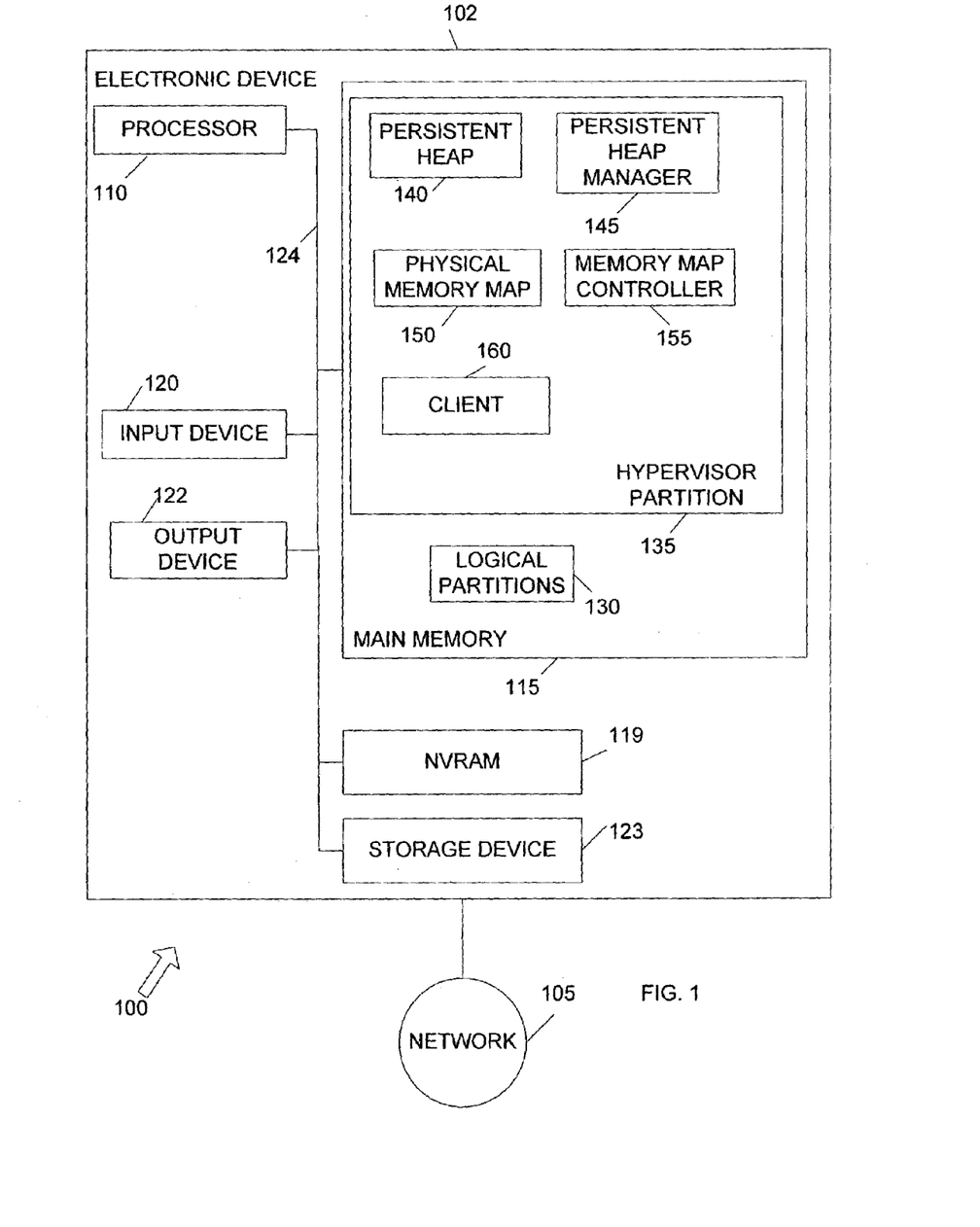
FIG. 1 depicts a block diagram of an example system for implementing an embodiment of the invention.

Turning to the drawings, wherein like numbers denote like parts throughout the several views, FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment, the network 105 is not present.

The electronic device 102 includes a processor or processors 110 connected directly or indirectly to a main memory 115, NVRAM (Non-Volatile Random Access Memory) 119, an input device 120, an output device 122, and a storage device 123 via a bus 124. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. In various embodiments, some or all of the processors 110 may be of the same or of different types. Although not depicted in FIG. 1, the processor 110 may include a variety of elements not necessary to understanding an embodiment of the invention. For example, the processor 110 may include a variety of execution units for executing instructions during a processor cycle, a bus interface unit for interfacing to the bus 124, a fetcher for fetching instructions, and queues and/or caches for holding instructions and data. In other embodiments, the processor 110 may include any appropriate elements.

The processor 110 executes instructions and includes that portion of the electronic device 102 that controls the operation of the electronic device. The processor 110 reads and/or stores code and data to and/or from the NVRAM 119, the storage device 123 and/or the network 105, reads data from the input device 120 and writes data to the output device 122.

Although only a single bus 124 is shown, embodiments of the present invention apply equally to electronic devices that may have multiple buses with some or all performing different functions in different ways.

The main memory 115 represents one or more mechanisms for storing data. For example, the main memory 115 may include random access memory (RAM). In other embodiments, any appropriate type of main memory may be used. Although only one main memory 115 is shown, multiple memories and multiple types and levels of memory may be present. In an embodiment, some or all of the contents of the main memory 115 are initially loaded from the NVRAM 119. In another embodiment, some or all of the contents of the main memory 115 are initially loaded from the storage device 123 and moved between the main memory 115 and the storage device 123 via a paging technique, although in other embodiments any appropriate technique may be used.

The main memory 115 includes one or more logical partitions 130 and a hypervisor partition 135. The resources, memory, and processors of the electronic device 102 may be divided into any number of logical partitions 130, which are managed by the hypervisor partition 135, according to an embodiment of the invention. In an embodiment, each of the logical partitions utilizes an operating system (not shown), which controls the primary operations of the respective logical partition in the same manner as the operating system of a non-partitioned computer.

In an embodiment, the contents of the hypervisor partition 135 are initially loaded from the NVRAM 119, and the hypervisor partition 135 has no associated storage device, so the contents of the hypervisor partition 135 are not paged between the main memory 115 and the storage device 123. In another embodiment, a storage device is associated with the hypervisor partition 135.

Each logical partition 130 executes in a separate, or independent, memory space. Moreover, the hypervisor partition 135 statically and/or dynamically allocates a portion of the available resources in the electronic device 102. For example, the hypervisor partition 135 may allocate one or more processors 110, as well as a portion of the available memory space in the main memory 115 among the logical partitions 130. The logical partitions 130) can share specific hardware resources such as processors, such that a given processor is utilized by more than one logical partition. In another embodiment, the hypervisor partition 135 can allocate certain resources to only one of the logical partitions 130 at a time.

The hypervisor partition 135 includes a persistent heap 140, a persistent heap manager 145, a physical memory map 150, a memory map controller 155, and a client 160.

The persistent heap 140 includes memory allocations used by the clients 160, and the clients desire the contents of the persistent heap 140 to persist across a memory-preserving IPL of the hypervisor partition 135. A memory-preserving IPL is a type of initial program load that starts or restarts the hypervisor partition 135 while maintaining the contents and allocation of selected memory locations within the main memory 115. The persistent heap 140 is further described below with reference to FIG. 2.

The persistent heap manager 145 manages the persistent heap 140. The persistent heap manager 145 may include instructions capable of being executed by the processor 110 and/or statements capable of being interpreted by instructions that execute on the processor 110. In another embodiment, some or all of the functions of the persistent heap manager 145 may be implemented via logic gates and/or other hardware mechanisms in lieu of or in addition to a processor-based system. The functions of the persistent heap manager 145 are further described below with reference to FIGS. 4 and 7.

The physical memory map 150 is a data structure that maps the physical locations in the main memory 115. Entries in the physical memory map 150 include an indication of whether the contents of the associated memory are persistent, i.e., whether the contents are to persist across a memory-preserving IPL. The physical memory map 150 is further described below with reference to FIG. 2.

The memory map controller 155 controls access to the physical memory map 150. The memory map controller 155 may include instructions capable of being executed by the processor 110 and/or statements capable of being interpreted by instructions that execute on the processor 110. In another embodiment, some or all of the functions of the memory map controller 155 may be implemented via logic gates and/or other hardware mechanisms in lieu of or in addition to a processor-based system. The functions of the memory map controller 155 are further described below with reference to FIG. 5.

The client 160 manipulates data within the main memory 115. The client 160 may include instructions capable of being executed by the processor 110 and/or statements capable of being interpreted by instructions that execute on the processor 110. In another embodiment, some or all of the functions of the client 160 may be implemented via logic gates and/or other hardware mechanisms in lieu of or in addition to a processor-based system. The functions of the client 160 are further described below with reference to FIGS. 3 and 6.

Although the persistent heap 140, the persistent heap manager 145, the physical memory map 150, the memory map controller 155, and the client 160 have been described in the context of the hypervisor partition 135 managing the logical partitions 130, in other embodiments they may operate in any other appropriate context.

The storage device 123 represents one or more mechanisms for storing data. For example, the storage device 123 may include non-volatile random access memory (NVRAM), removable or fixed magnetic-disk storage media, optical storage media, flash memory devices, and/or other machine-readable media. In other embodiments, any appropriate type of storage device may be used. Although only one storage device 123 is shown, multiple storage devices and multiple types and levels of storage devices may be present. Further, although the electronic device 102 is drawn to contain the storage device 123, it may be distributed across other electronic devices, for example electronic devices connected via a network, such as the network 105.

The input device 120 may be a keyboard, mouse or other pointing device, trackball, touchpad, touchscreen, keypad, microphone, voice recognition device, or any other appropriate mechanism for the user to input data to the electronic device 102. Although only one input device 120 is shown, in another embodiment any number, (including zero) and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number (including zero) of output devices of different types or of the same type may be present.

The bus 124 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The exemplary environments illustrated in FIG. 1 are not intended to limit the present invention. Indeed, other alternative hardware and/or software environments may be used without departing from the scope of the invention.

As will be described in detail below, aspects of an embodiment of the invention pertain to specific apparatus and method elements implementable on a computer, processor, or other electronic device. In another embodiment, the invention may be implemented as a program product for use with a computer, processor, or other electronic device. The programs defining the functions of this embodiment may be delivered to the computer, processor, or other electronic device via a variety of computer-readable storage media, which include, but are not limited to:

(1) information permanently stored on a non-rewriteable storage medium, e.g., a read-only memory device attached to or within a computer, processor, or other electronic device, such as a CD-ROM readable by a CD-ROM drive; or (2) alterable information stored on a rewriteable storage medium, e.g., a hard disk drive or diskette.

Such computer-readable storage media, when carrying machine-readable instructions that direct the functions of the present invention, represent embodiments of the present invention.

Figure 2:
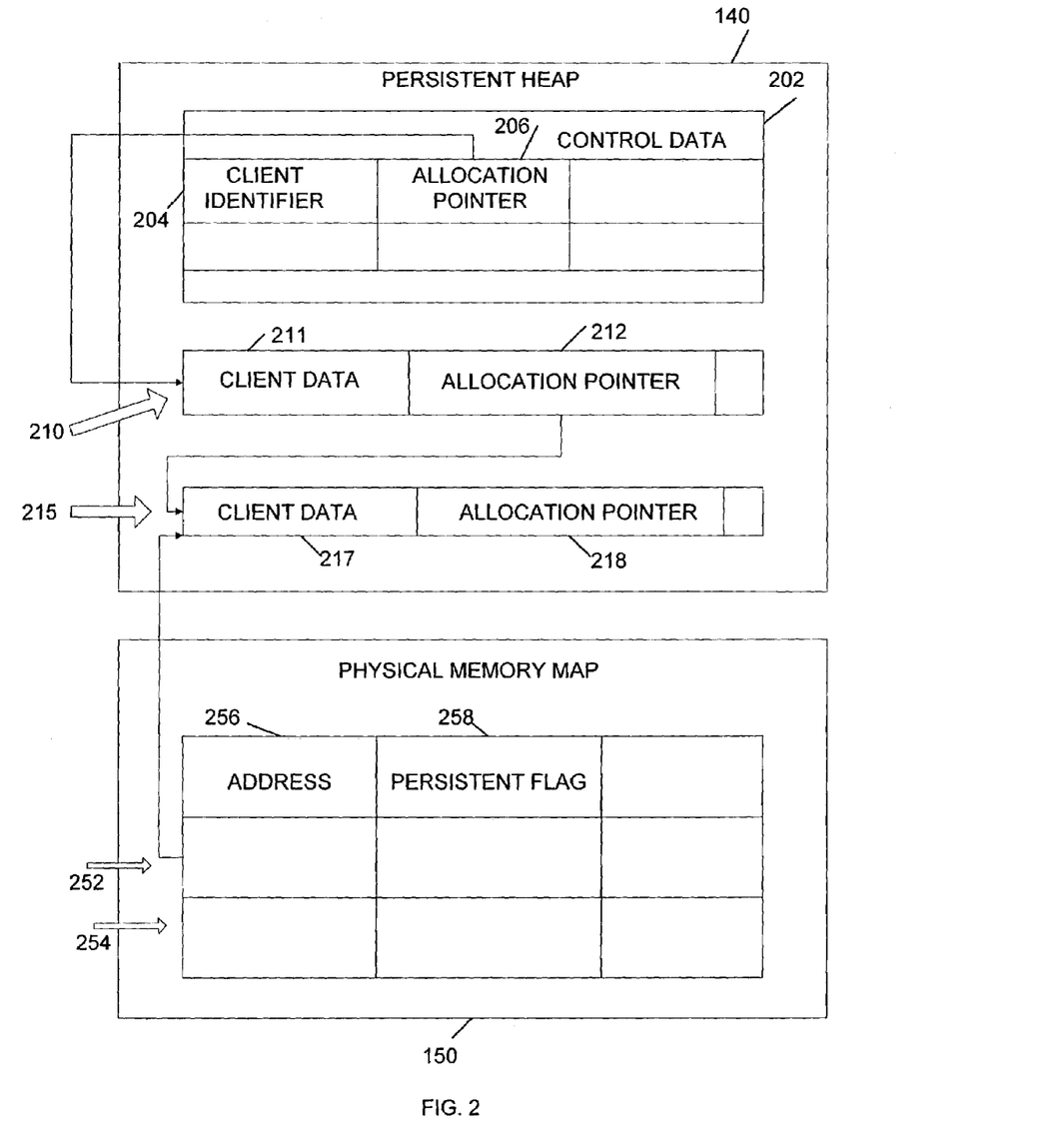
FIG. 2 depicts a block diagram of example data structures, according to an embodiment of the invention.

FIG. 2 depicts a block diagram of example data structures for the persistent heap 140 and the physical memory map 150, according to an embodiment of the invention. The persistent heap 140 includes control data 202, and allocation entries 210 and 215.

The control data 202 includes an entry for each of the clients 160 that has allocated memory. Each entry includes a client identifier 204 and an allocation pointer 206. The control data 202 may also include other information not necessary for an understanding of an embodiment of the invention. The client identifier 204 identifies the client associated with the entry in the control data 202 and associated with the allocation entries 210 and 215. The allocation pointer 206 contains the address of or points at the allocation entry 210.

The allocation entry 210 includes client data 211 and an allocation pointer 212, which contains the address of or points at the next allocation entry 215. The client data 211 may include any information associated with the client identified by the client identifier 204. The allocation entry 210 may also include other information not necessary for an understanding of an embodiment of the invention The allocation entry 215 includes client data 217 and an allocation pointer 218. The client data 217 may include any information associated with the client identified by the client identifier 204. The allocation entry 215 may also include other information not necessary for an understanding of an embodiment of the invention. The allocation pointer 218 may be null or may in other embodiments contain any other information that identifies that the allocation entry 215 is the last entry and no further entries are associated with the client identifier 204.

Although the example shown illustrates two allocation entries 210 and 215, in other embodiments any appropriate number of allocation entries may be present.

The physical memory map 150 includes an entry for every memory allocation in the main memory 115. Although two entries 252 and 254 are shown in the physical memory map 150, in other embodiments any number of entries may be present corresponding to the number of memory allocations. Each entry includes an address field 256 and a persistent flag field 258. The address field 256 points at the associated allocation entry. For example, the entry 252 is associated with the allocation entry 215. The persistent flag field 258 indicates whether the associated allocation entry pointed at by the address field 256 is to persist across a memory-preserving IPL. For example, if the persistent flag field 258 is on, the associated allocation entry is to persist across a memory-preserving IPL, and if the persistent flag field 258 is off, the associated allocation entry is not to persist across a memory-preserving IPL. Although the persistent flag field 258 is described as being a flag, in other embodiments it may be implemented via any appropriate type of indicator.

Figure 3:
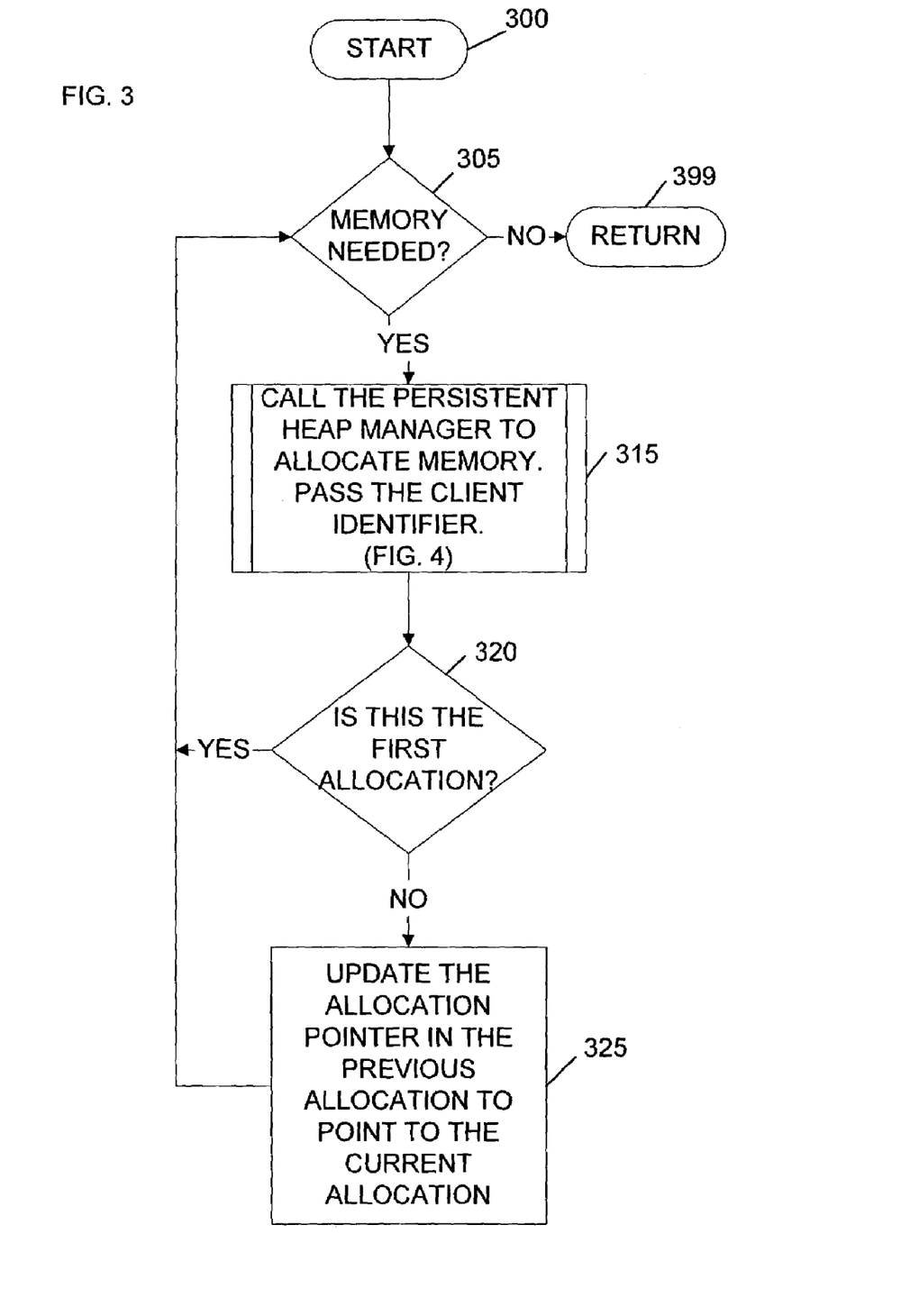
FIG. 3 depicts a flowchart of example processing for a client process, according to an embodiment of the invention.

FIG. 3 depicts a flowchart of example processing for a client process 160 that allocates memory for the client 160, according to an embodiment of the invention. Control begins at block 300. Control then continues to block 305 where the client 160 determines whether the client needs more memory allocated in the main memory 115. If the determination at block 305 is false, then control continues to block 399 where the function returns. If the determination at block 305 is true, then control continues to block 315 where the client 160 requests the persistent heap manager 145 to allocate a portion of the memory 115, as further described below with reference to FIG. 4. The client 160 passes an identifier of the client 160 to the persistent heap manager 145. Control then continues to block 320 where the client 160 determines whether the allocation provided in block 315 is the first allocation made by the client 160. If the determination at block 320 is true, then control returns to block 305, as previously described above.

If the determination at block 320 is false, then control continues to block 325 where the client 160 updates the allocation pointer in the previous allocation to point to the current allocation. Using the example of FIG. 2, when the previous allocation was the allocation 210 and the current allocation is the allocation 215, the client 160 updates the previous allocation pointer 212 to point to the current allocation 215. In this way, the client 160 constructs a linked list of memory allocations, but in other embodiments any appropriate data structure may be used. Control then returns to block 305, as previously described above.

Figure 4:
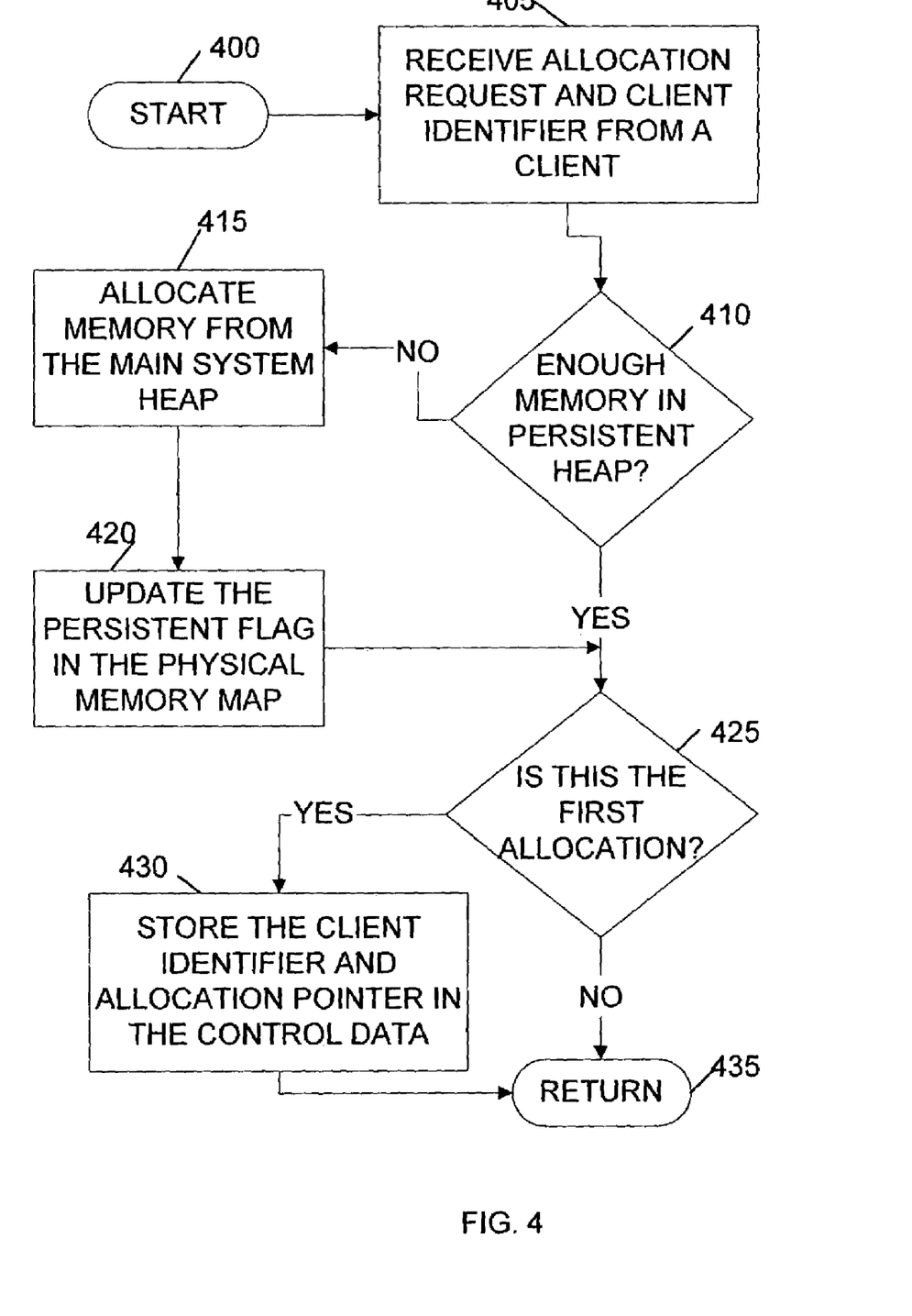
FIG. 4 depicts a flowchart of example processing for a persistent heap manager, according to an embodiment of the invention.

FIG. 4 depicts a flowchart of example processing for the persistent heap manager 145, according to an embodiment of the invention. Control begins at block 400. Control then continues to block 405 where the persistent heap manager 145 receives an allocation request from the client 160 and an identifier that identifies the particular client. Control then continues to block 410 where the persistent heap manager 145 determines whether the persistent heap 140 already contains enough memory.

If the determination at block 410 is false, then control continues to block 415 where the persistent heap manager 145 allocates memory from the main system heap (not shown), such as the allocation 210 or the allocation 215 as previously described above with reference to FIG. 2. In response to the allocation, the memory map controller 155 creates an entry, such as the entry 252 or the entry 254 in the physical memory map 150 and sets the address 256 to point to the allocation, such as the allocation 210 or the allocation 215.

Control then continues to block 420 where the persistent heap manager 145 updates the persistent flag 258 in the entry in the physical memory map 150 that is associated with the allocated memory. Control then continues to block 425 where the persistent heap manager 145 determines whether the allocation request is the first request from the client associated with the identifier. If the determination at block 425 is true, then control continues to block 430 where the persistent heap manager 145 stores the client identifier and allocation pointer in the control data 202. Control then continues to block 435 where the function returns.

If the determination at block 425 is false, then control continues directly from block 425 to block 435 where the function returns.

If the determination at block 410 is true, then it is not necessary for the persistent heap manager 145 to allocate any more memory, so control continues directly from block 410 to block 425, as previously described above.

Figure 5:
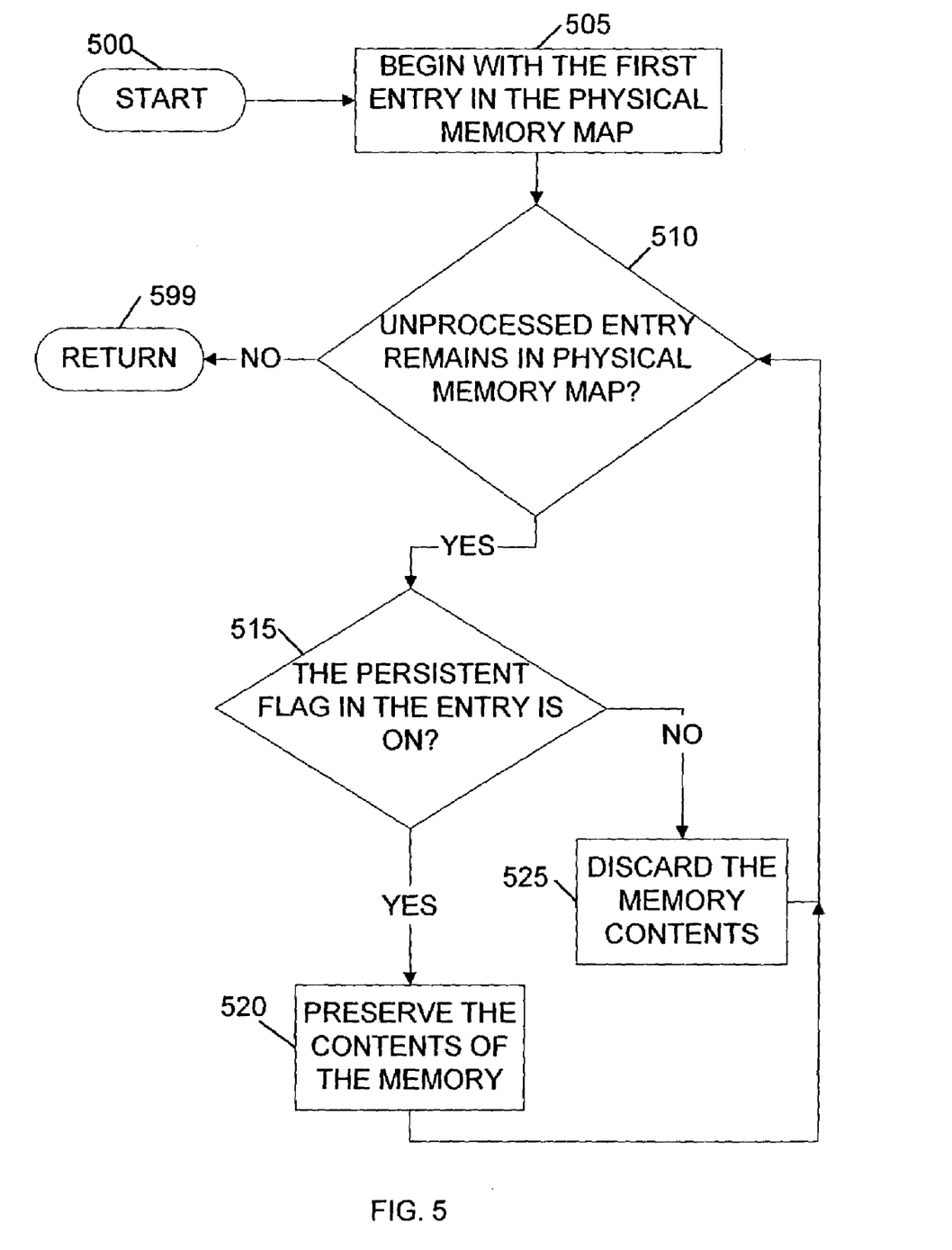
FIG. 5 depicts a flowchart of example processing for a memory map controller during a memory-preserving IPL (Initial Program Load), according to an embodiment of the invention.

FIG. 5 depicts a flowchart of example processing for the memory map controller 155 during a memory-preserving IPL (Initial Program Load), according to an embodiment of the invention. Control begins at block 500. Control then continues to block 505 where the memory map controller 155 begins processing the contents of the physical memory map 150 at the first entry. Control then continues to block 510 where the memory map controller 155 determines whether an unprocessed entry remains in the physical memory map 150. If the determination at block 510 is false, then control then continues to block 599 where the function returns.

If the determination at block 510 is true, then control continues to block 515 where the memory map controller 155 determines whether the persistent flag 258 in the current entry is on. If the determination at block 515 is true, then control continues to block 520 where the memory map controller 155 preserves the contents in the memory allocation associated with the current entry in the physical memory map 150. Using again the example of FIG. 2, if the persistent flag 258 is on in the entry 252, the memory map controller 155 preserves the contents of the allocation 215 and keeps the memory allocated during the memory-preserving IPL. Control then returns to block 510, as previously described above.

If the determination at block 515 is false, then control continues to block 525 where the memory map controller 155 discards the memory contents associated with the current entry and in an embodiment deallocates the memory allocation. Control then returns to block 510, as previously described above.

Figure 6:
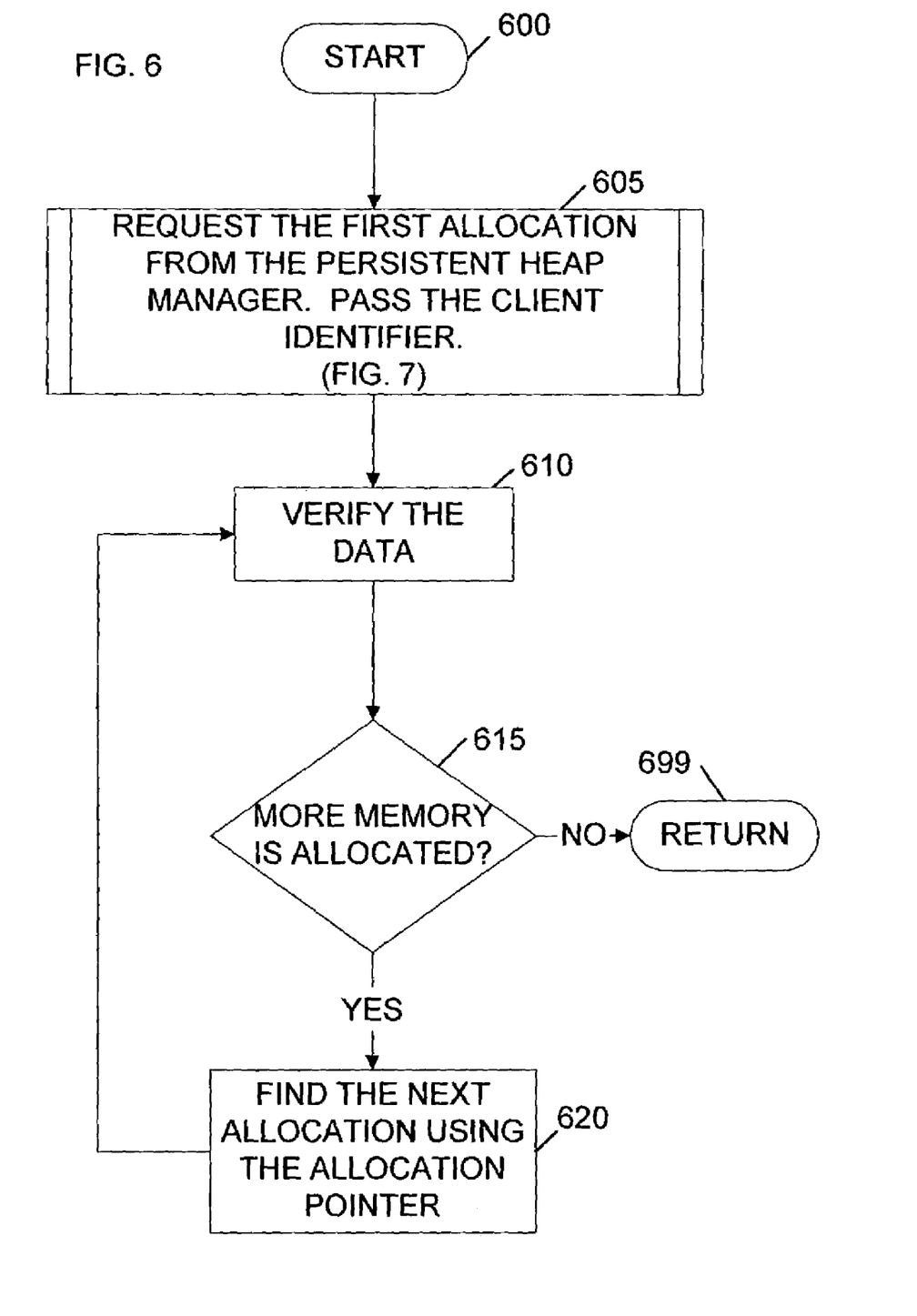
FIG. 6 depicts a flowchart of example processing for a client during a memory-preserving IPL, according to an embodiment of the invention.

FIG. 6 depicts a flowchart of example processing for the client 160 during a memory-preserving IPL, according to an embodiment of the invention. Control begins at block 600. Control then continues to block 605 where the client 160 requests the first allocation associated with the client from the persistent heap manager 145, as further described below with reference to FIG. 7. Referring again to FIG. 6, the client 160 identifies itself by passing client identifier to the persistent heap manager 145. Control then continues to block 610 where the client 160 verifies whether the data in the current allocation is valid. For example, if the current allocation is the allocation 210, the client 160 verifies that the client data 211 is valid.

Control then continues to block 615 where the client 160 determines whether another allocation exists in the main memory 115. In an embodiment, with reference to the example of FIG. 2, the client 160 makes the determination at block 615 by checking whether the allocation pointer, such as the allocation pointer 212 or 218 is null. If the determination at block 615 is false, then control continues to block 699 where the function returns.

If the determination at block 615 is true, then control continues to block 620 where the client 160 finds the next allocation, for example using the allocation pointer in the current allocation in the persistent heap 140. Control then returns to block 610, as previously described above.

Figure 7:
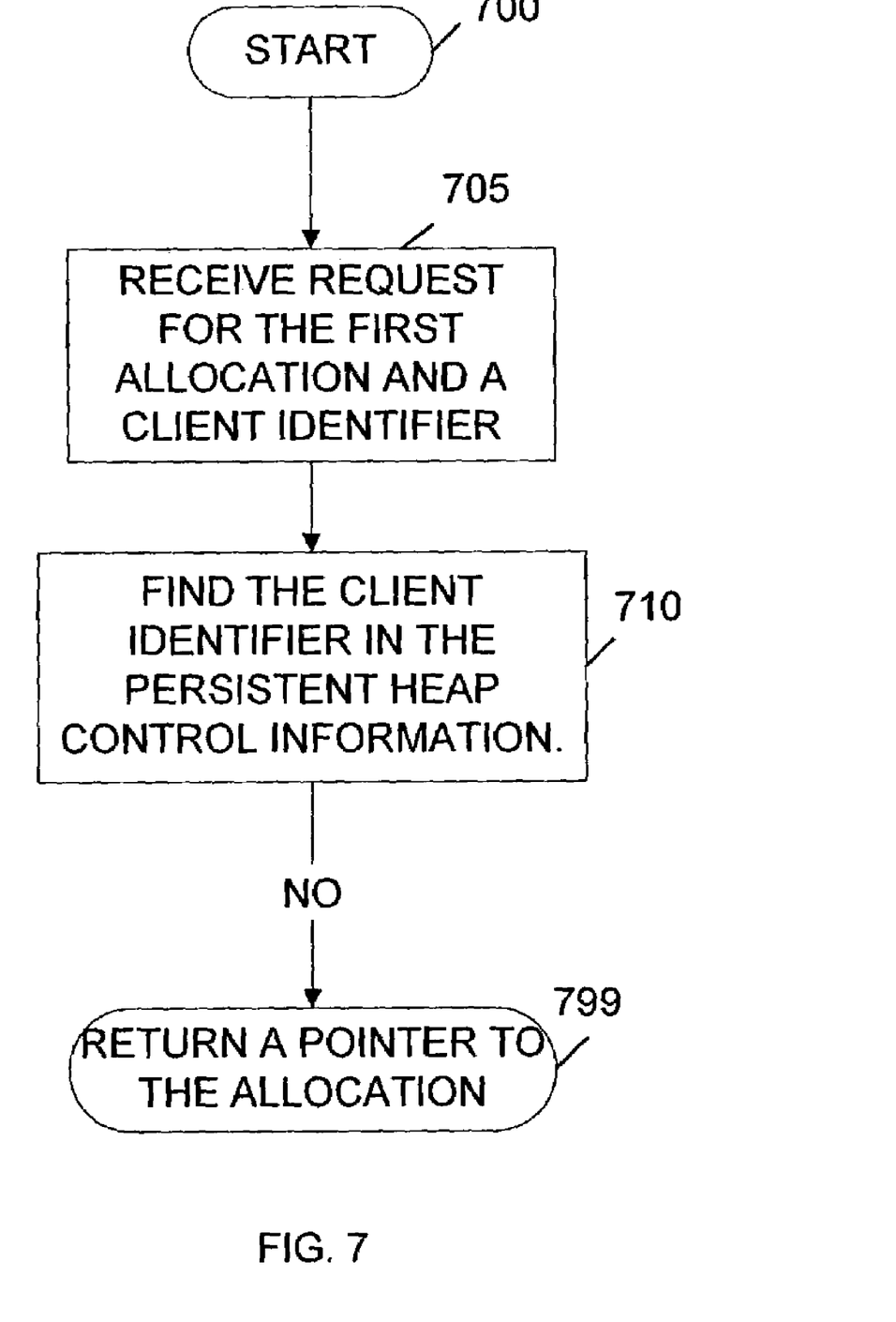
FIG. 7 depicts a flowchart of example processing for a function in a persistent heap manager that finds an allocation of memory associated with a client, according to an embodiment of the invention.

FIG. 7 depicts a flowchart of example processing for a function in the persistent heap manager 145 that finds an allocation associated with a client, according to an embodiment of the invention. Control begins at block 700. Control then continues to block 705 where the persistent heap manager 145 receives a request for the first allocation from the client 160 and an identifier that identifies the client 160. Control then continues to block 710 where the persistent heap manager 145 finds the client identifier in the control data 202 of the persistent heap 140. Control then continues to block 799 where the persistent heap manager 145 returns the allocation pointer 206 in the control data 202, which points at the first allocation associated with the client, which is the allocation 210 in the example of FIG. 2.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   updating a persistent indicator associated with allocated memory, wherein the allocated memory is associated with a hypervisor partition that is to manage a plurality of logical partitions;
   determining whether to preserve contents of the allocated memory during an IPL based on the persistent indicator;
   preserving the contents of the allocated memory during the IPL if the persistent indicator is on; and
   discarding the contents of the allocated memory during the IPL if the persistent indicator is off.

2. The method of claim 1, further comprising:
   verifying the contents of the allocated memory during the IPL.

3. An apparatus comprising:
   means for updating a persistent indicator associated with allocated memory, wherein the allocated memory is associated with a hypervisor partition that is to manage a plurality of logical partitions;
   means for determining whether to preserve contents of the allocated memory based on the persistent indicator;
   means for preserving the contents of the allocated memory during a memory-preserving IPL if the persistent indicator is on; and
   means for discarding the contents of the allocated memory during the memory-preserving IPL if the persistent indicator is off.

4. The apparatus of claim 3, further comprising:
   means for verifying the contents of the allocated memory during the memory-preserving IPL.

5. The apparatus of claim 3, further comprising:
   means for associating a client identifier with the allocated memory.

6. A computer-readable storage medium encoded with instructions, wherein the instructions when executed comprise:
   updating a persistent indicator associated with allocated memory, wherein the allocated memory is associated with a hypervisor partition that is to manage a plurality of logical partitions;
   determining whether to preserve contents of the allocated memory based on the persistent indicator;
   preserving the contents of the allocated memory during a memory-preserving IPL if the persistent indicator is on; and
   discarding the contents of the allocated memory during the memory-preserving IPL if the persistent indicator is off.

7. The computer-readable storage medium of claim 6, further comprising:
   verifying the contents of the allocated memory during the memory-preserving IPL.

8. The computer-readable storage medium of claim 6, further comprising:
   associating a client identifier with the allocated memory.

9. A computer-readable storage medium encoded with a data structure accessed by a memory-map controller that is to be executed by a processor, wherein the data structure comprises at least one entry, wherein the at least one entry comprises:
   an address of allocated memory, wherein the allocated memory is associated with a hypervisor partition that is to manage a plurality of logical partitions; and
   a persistent indicator, wherein the memory-map controller determines whether to preserve contents of the allocated memory during a memory-preserving IPL based on the persistent indicator, and wherein the memory-map controller further preserves the contents of the allocated memory during the memory-preserving IPL if the persistent indicator is on and discards the contents of the allocated memory during the memory-preserving IPL if the persistent indicator is off.

10. The computer-readable storage medium of claim 9, wherein the memory-map controller further deallocates the allocated memory during the memory-preserving IPL if the persistent indicator is off.

11. The computer-readable storage medium of claim 9, wherein the allocated memory is associated with a client in the hypervisor partition.

12. An electronic device comprising:
    a processor; and
    a main memory encoded with instructions, wherein the instructions when executed on the processor comprise:
       creating a memory allocation in the main memory, wherein the memory allocation is associated with a client in a hypervisor partition in the electronic device,
       updating a persistent flag in an entry in a memory map, wherein the entry is associated with the memory allocation,
       preserving the memory allocation during an IPL of the hypervisor partition if the persistent indicator is on, and
       deallocating the memory during an IPL of the hypervisor partition if the persistent indicator is off.

13. The electronic device of claim 12, wherein the TPL is a memory-preserving IPL.

14. The electronic device of claim 12, wherein the creating further comprises creating a linked list with control data and at least one client data entry.

15. The electronic device of claim 14, wherein the creating further comprises storing an identifier that identifies the client.

* * * * *